United States Patent
Diniz et al.

(10) Patent No.: US 10,760,608 B2
(45) Date of Patent: Sep. 1, 2020

(54) ELECTRICAL CONNECTOR WITH SHEARABLE FASTENER

(71) Applicant: Hubbell Incorporated, Shelton, CT (US)

(72) Inventors: Milton Egas Diniz, Sao Paulo (BR); Gustavo Ferreira Nishimura, Sao Paulo (BR)

(73) Assignee: Hubbell Incorporated, Shelton, CT (US)

( * ) Notice: Subject to any disclaimer, the term of this patent is extended or adjusted under 35 U.S.C. 154(b) by 344 days.

(21) Appl. No.: 15/100,457

(22) PCT Filed: Nov. 25, 2014

(86) PCT No.: PCT/US2014/067331
§ 371 (c)(1),
(2) Date: May 31, 2016

(87) PCT Pub. No.: WO2015/084639
PCT Pub. Date: Jun. 11, 2015

(65) Prior Publication Data
US 2016/0298670 A1  Oct. 13, 2016

Related U.S. Application Data

(60) Provisional application No. 61/910,630, filed on Dec. 2, 2013.

(51) Int. Cl.
*F16B 31/02* (2006.01)
*F16B 35/00* (2006.01)
*H01R 4/36* (2006.01)
*H01R 43/04* (2006.01)

(52) U.S. Cl.
CPC .......... *F16B 31/021* (2013.01); *F16B 35/005* (2013.01); *H01R 4/36* (2013.01); *H01R 43/04* (2013.01)

(58) Field of Classification Search
CPC ...... F16B 31/021; F16B 35/005; H01R 43/04; H01R 4/36
See application file for complete search history.

(56) References Cited

U.S. PATENT DOCUMENTS

| | | | |
|---|---|---|---|
| 2,830,635 | A | 4/1958 | Thorstens |
| 3,498,174 | A | 3/1970 | Schuster et al. |
| 3,622,946 | A | 11/1971 | Rogers |
| 3,865,007 | A | 2/1975 | Gryctko |
| 4,199,216 | A | 4/1980 | Gryctko |

(Continued)

OTHER PUBLICATIONS

PCT/US2014/067331 International Search Report and Written Opinion dated Feb. 20, 2015.

*Primary Examiner* — Minh N Trinh
(74) *Attorney, Agent, or Firm* — Michael Best & Friedrich, LLP (57) ABSTRACT

A fastener (20) includes a head (22), a base (26), a shearable section (24), and a removable blocking insert (50). The head (22) has an inner surface (30) that includes a first socket (36) for receiving a drive tool (T). The base (26) includes an outer surface (38) having a base thread (44). The shearable section (24) is positioned between the head (22) and the base (26) and has a predetermined torque limit. The removable blocking insert (50) is positioned to hinder access of a drive tool (T) to the base (26).

20 Claims, 6 Drawing Sheets

(56) References Cited

U.S. PATENT DOCUMENTS

| | | | |
|---|---|---|---|
| 5,429,466 A | 7/1995 | Nagayama | |
| 5,494,462 A | 2/1996 | Auclair | |
| 5,713,705 A | 2/1998 | Grunbichler | |
| 6,042,430 A * | 3/2000 | Hollick | F16B 31/021 411/309 |
| 6,884,124 B1 | 4/2005 | Luzzi | |
| 7,214,108 B2 | 5/2007 | Barnett | |
| 7,758,356 B2 | 7/2010 | Burris et al. | |
| 7,775,754 B2 * | 8/2010 | Calandra | F16B 13/143 405/259.1 |
| 8,317,443 B2 * | 11/2012 | Stauch | H01R 4/363 411/2 |
| 8,668,419 B2 * | 3/2014 | Hardt | H01R 4/307 411/2 |
| 9,388,840 B2 * | 7/2016 | O'Sullivan | F16B 31/021 |
| 9,835,192 B2 * | 12/2017 | Castonguay | H01R 4/36 |
| 2007/0253792 A1 | 11/2007 | Zahnen et al. | |
| 2009/0053940 A1 * | 2/2009 | Sweeney | H01R 4/366 439/791 |
| 2009/0075526 A1 | 3/2009 | King, Jr. et al. | |
| 2009/0311921 A1 * | 12/2009 | Kaine | H01R 4/363 439/798 |
| 2012/0276789 A1 | 11/2012 | Battle | |
| 2012/0328388 A1 * | 12/2012 | Hardt | F16B 31/021 411/5 |
| 2016/0298670 A1 * | 10/2016 | Diniz | F16B 35/005 |

* cited by examiner

ELECTRICAL CONNECTOR WITH SHEARABLE FASTENER

REFERENCE TO RELATED APPLICATIONS

This application claims the benefit of U.S. Provisional Application 61/910,630, filed on Dec. 2, 2013, the disclosure of which is hereby incorporated by reference in its entirety.

FIELD

Various exemplary embodiments relate to shearable fasteners and electrical connectors utilizing shearable fasteners.

BACKGROUND

In certain connection applications, a fastener, such as a set screw is used to secure an object. It may be important to apply the fastener at a specific torque or range of torques. Falling under a specific torque limit could result in an insecure connection, while exceeding a specific torque limit would damage one or more components.

One way to prevent over torqueing is to use a torque wrench that is, or can be, set to a specific torque limit. Torque wrenches, however, can be expensive and are not always available. It can also be difficult for a technician to carry and use multiple torque wrenches, or to properly set an adjustable torque wrench, that might be needed for an installation.

Another way to prevent over torqueing is the use of shearable or torque limit fasteners. Shearable fasteners include a shearable head connected to a fastener body. The head has a set torque limit and shears from the body when excess torque is applied.

SUMMARY

In an exemplary embodiment, a fastener includes a head, a base, a shearable section, and a removable blocking insert. The head has an inner surface that includes a first socket for receiving a drive tool. The base includes an outer surface having a base thread. The shearable section is positioned between the head and the base and has a predetermined torque limit. The removable blocking insert is positioned to limit access of a drive tool to the base.

According to another embodiment, a fastener includes a head, a base, a shearable section, and a removable blocking insert. The head has an inner surface that includes a first socket for receiving a drive tool. The base has an inner surface that includes a second socket for receiving a drive tool and an outer surface that has a thread. The shearable section is positioned between the head and the base and has a predetermined torque limit and an inner surface. The removable blocking insert is positioned to limit access of a drive tool to the second socket.

According to another exemplary embodiment, a connector assembly includes a connector block and a shearable fastener. The connector block is an electrically conductive connector block having a first aperture for receiving a conductor and a second aperture for receiving a fastener. A shearable fastener positioned in the second aperture of the connector block. The shearable fastener includes a head, a base, a shearable section, and a removable blocking insert. The head has an inner surface that includes a first socket for receiving a drive tool. The base has an inner surface that includes a second socket for receiving a drive tool and an outer surface that has a thread. The shearable section is positioned between the head and the base and has a predetermined torque limit and an inner surface. The removable blocking insert is positioned to limit access of a drive tool to the second socket.

An exemplary method of connecting an electrical conductor to a connector block includes inserting an electrical conductor into a first aperture of a connector block. A shearable fastener having a head, a base, a shearable section including a torque limit, and a removable blocking insert is inserted into a second aperture of the connector block. The shearable fastener is aligned to engage the inserted electrical conductor. A tool is inserted into the head of the shearable fastener. The shearable fastener is rotated into the connector block until the torque limit is exceeded. The head of the fastener is separated from the base and the blocking insert is removed from the shearable fastener.

BRIEF DESCRIPTION OF DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

In an exemplary embodiment, the shearable fastener 20 has a head 22, a shearable section 24, and a base 26. The head 22, shearable section 24, and base 26 are depicted as an integral structure with the head 22 connected to the base 26 by the shearable section 24. The shearable fastener 20 may be formed through molding or casting and made from metal. The shearable fastener 20 can be made from a variety of materials and combinations of materials, for example tin-plated aluminum. The shearable fastener 20 can be rated for use with various conductors, for example aluminum and copper conductors. In various alternative embodiments, the shearable fastener can be made from different materials, including plastics, ceramics, or composite materials. In alternative embodiments, the head 22, shearable section 24, and base 26 may also be different components that are connected or attached to one another.

In an exemplary embodiment, the head 22 includes a head outer surface 28 and a head inner surface 30. The outer surface 28 includes an outer thread 32 and a shank 34. Instead of a thread 32, the head outer surface 28 may have a shape configured to interact with a tool. For example, the head outer surface 28 may have the shape of a hexagonal nut sized to fit a wrench. Different sizes, shapes, and configuration of the head 22 can be used depending on the desired application.

The head inner surface 30 defines a central cavity and includes a head socket 36. The head socket 36 is configured to receive a drive tool T. The head socket 36 has a non-circular cross-sectional configuration, depicted in the exemplary embodiment as a hexagon for receiving an Allen wrench. Other non-circular configurations may be used, including other rectilinear or non-circular curvilinear shapes. The socket 36 may be shaped to receive any type of drive tool T, for example any of the various screw drivers and wrenches (flat, hex, square, Phillips, spline, etc.) known to those with skill in the art.

The shearable section 24 is positioned between and connects the head 22 and the base 26. The inner surface of the shearable section 24 may be continuous with the head inner surface 30 having the same shape as the head socket 36, or it may have a different configuration, such as a circular surface. The shearable section 24 is weakened compared to the rest of the shearable fastener 20 and is designed to rupture, allowing the head 22 to separate from the base 26. The shearable section 24 therefore forms a torque limit and begins to shear upon application of torque exceeding the torque limit. In an exemplary embodiment, the shearable section 24 is weakened due to a reduced wall thickness.

In an exemplary embodiment, the shearable section 24 has a reduced diameter with respect to the head 22 and the base 26. The reduced diameter may be formed through machining such as milling, turning, laser etching, etc. The reduced diameter may also be formed through a molding or casting process. The diameter and wall thickness of the shearable section 24 may be altered depending on the material of the fastener 20 and the desired torque limit. In various alternative embodiments, the shearable section 24 may include a frangible connection formed by openings, perforations, or deformations in the shearable section 24. More than one shearable section 24 may also be provided to allow shearing of the fastener 20 at different lengths. Multiple shearable sections 24 may also have different torque limits.

The size and/or strength of the shearable section 24 may be established dependent on the application and desired torque limit. In various exemplary embodiments, the torque limit may be in the approximate range of about 3 to about 7 N·m, about 3 to about 6 N·m, about 4 to about 5 N·m, about 4 to about 7 N·m, about 5 to about 6 N·m, or about 5 to about 7 N·m.

The base 26 includes a base outer surface 38, a base inner surface 40, and a bottom surface 42. The base outer surface 38 includes a base thread 44 and a base shank 46. The base thread 44 may be a continuation of the head outer thread 32, having the same pitch, diameter, and shape. The base inner surface 40 includes a base socket 48. In an exemplary embodiment, the base socket 48 is an extension of the head socket 36, having the same transverse cross-sectional shape and size. As shown, the base socket 48 includes a hexagonal drive surface, although any of the alternative sizes or configurations discussed above with respect to the head socket 36 may be used. The base socket 48 may have a different configuration than the head socket 36, including any of the alternative sizes or configurations discussed above with respect to the head socket 36. The base socket 48 allows for removal of the shearable fastener 20 after the head 22 has been separated from the base 26.

Figure 1:
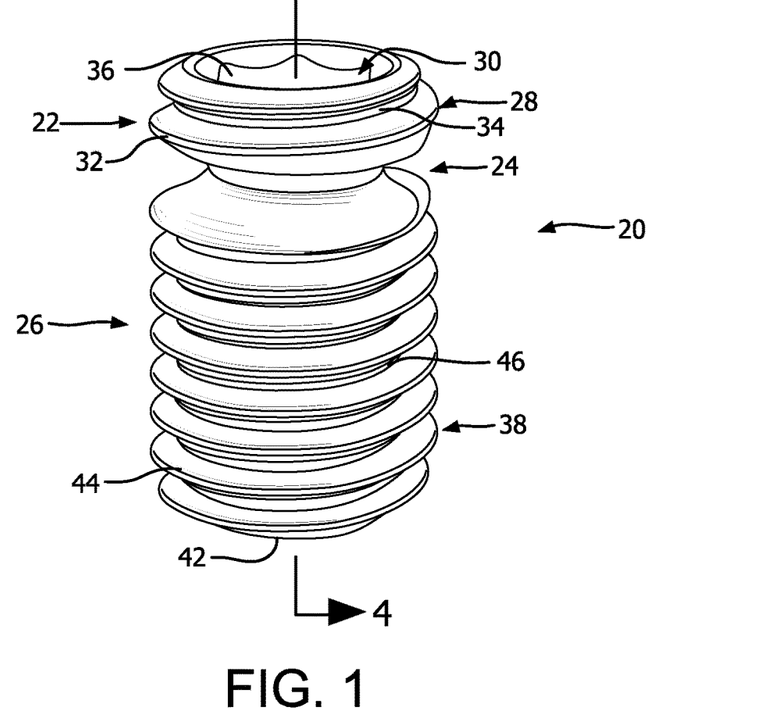
FIG. 1 is a front perspective view of an exemplary shearable fastener.
Figure 2:
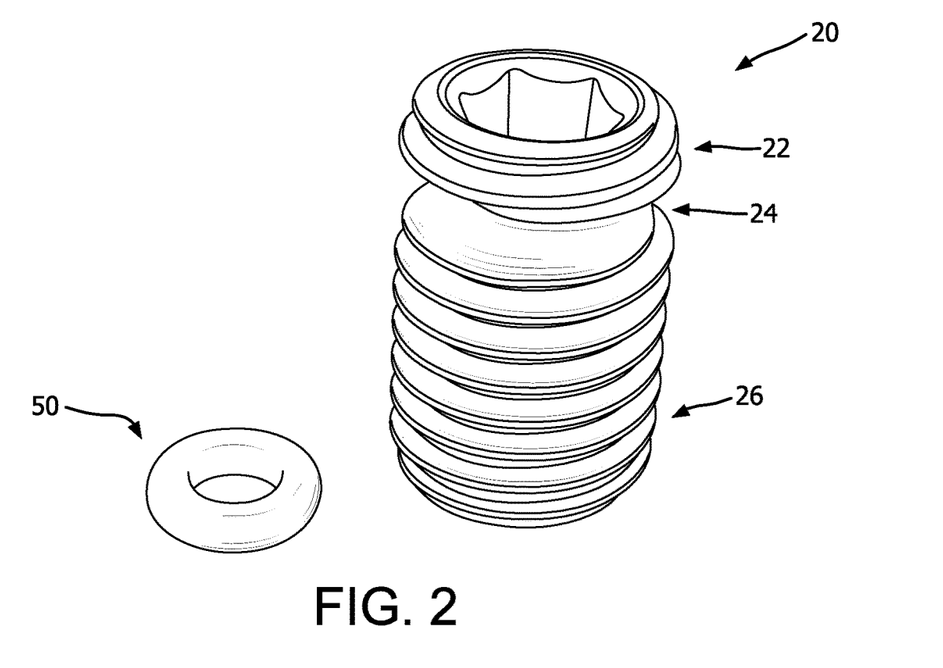
FIG. 2 is a front perspective view of the shearable fastener of FIG. 1 with an insert member removed.
Figure 3:
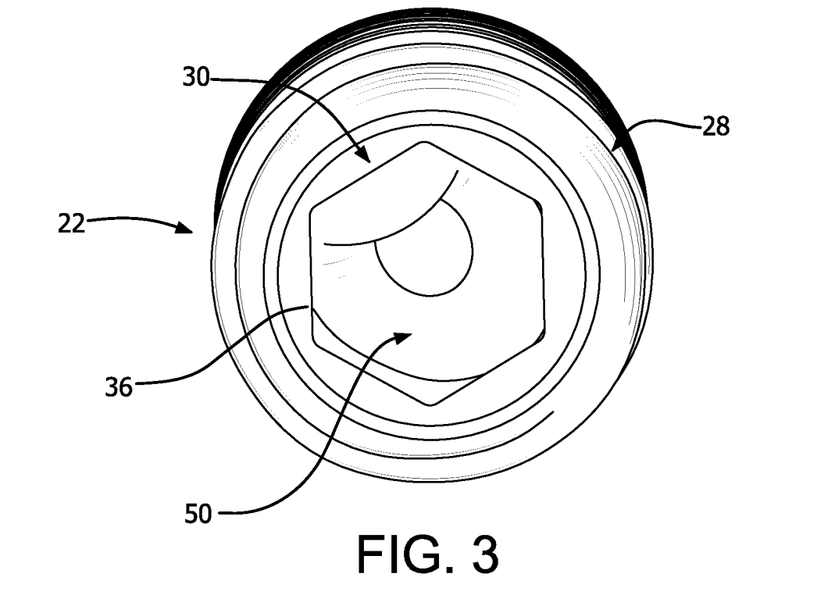
FIG. 3 is a top perspective view of the shearable fastener of FIG. 1.
Figure 4:
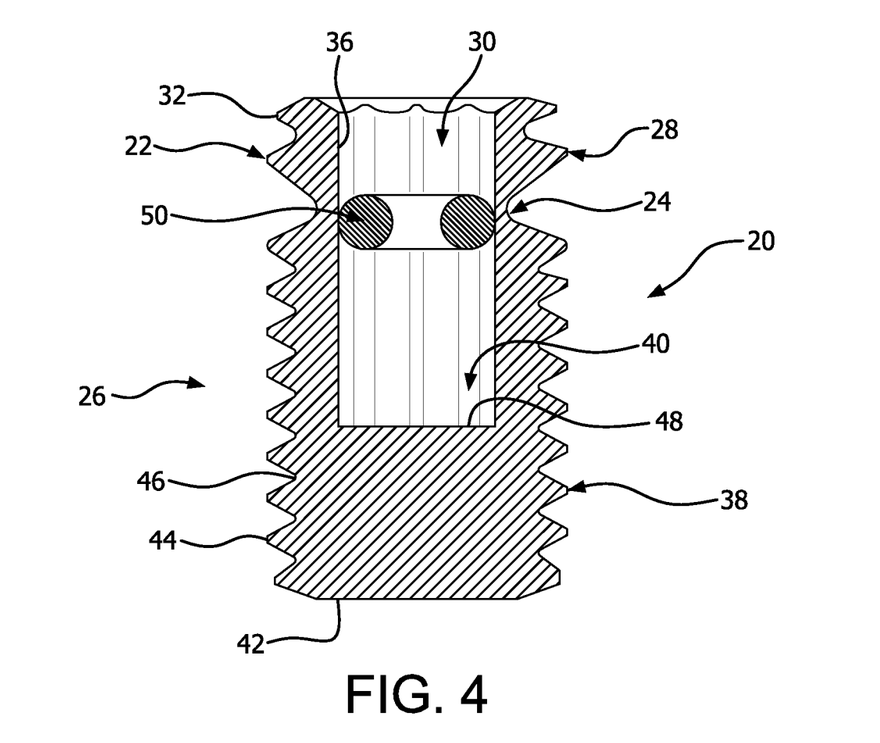
FIG. 4 is a side elevational view in section of the shearable fastener of FIG. 1 taken along line 4-4.
Figure 5:
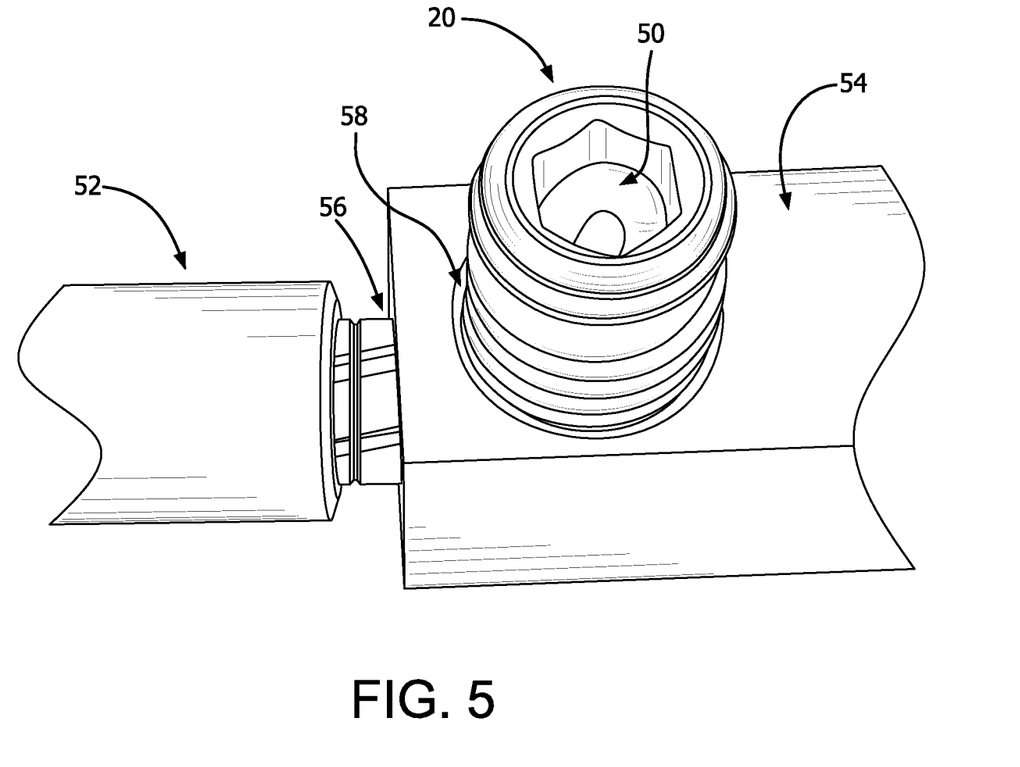
FIG. 5 is a top perspective view of the shearable fastener of FIG. 1 used in connection with an exemplary conductor and an exemplary connector block.
Figure 6:
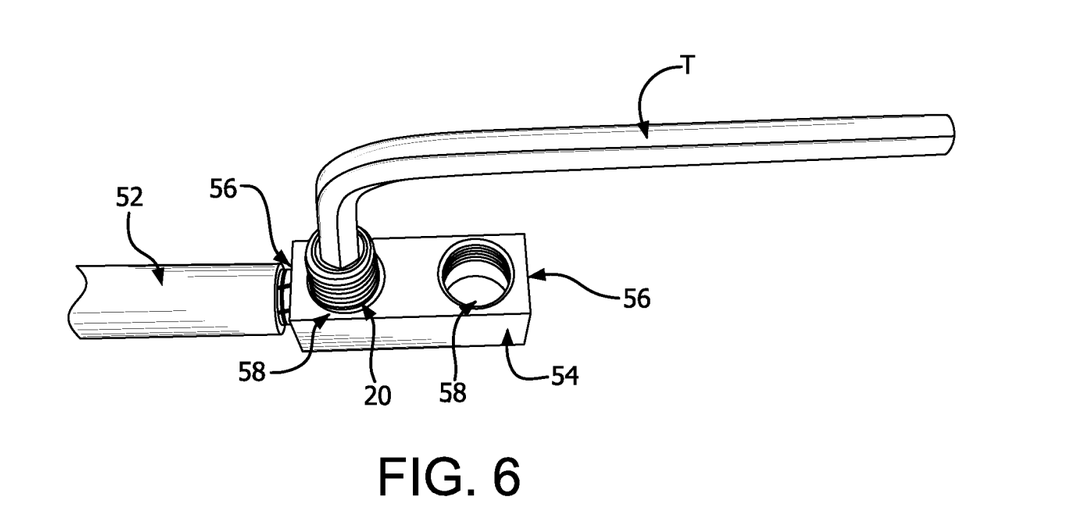
FIG. 6 is a top perspective view of the shearable fastener, conductor, and connector block of FIG. 5 with a tool engaging the shearable fastener.
Figure 7:
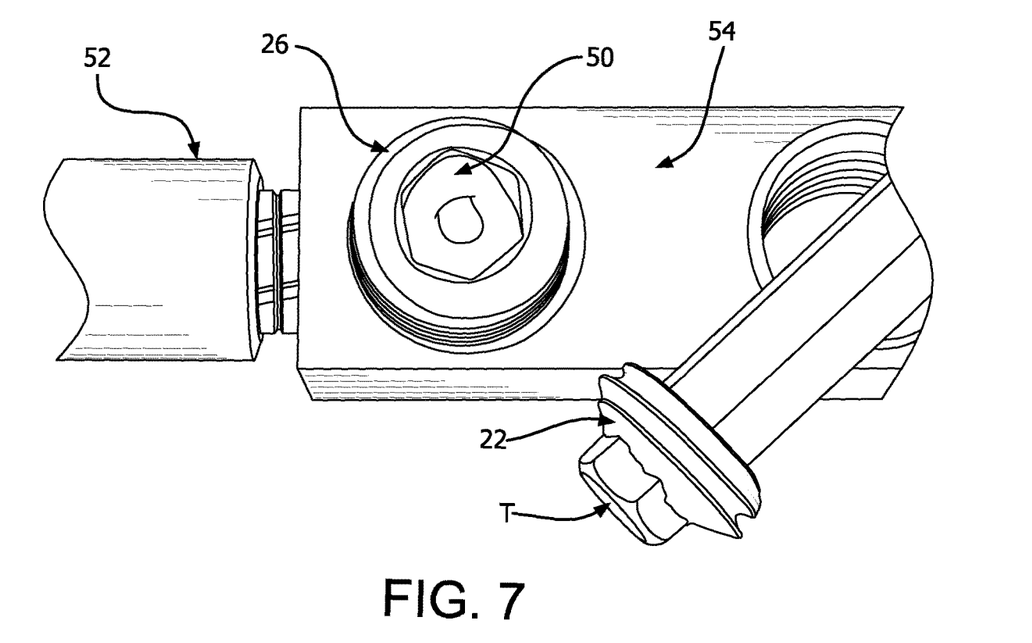
FIG. 7 is a top perspective view of the shearable fastener, conductor, and connector block of FIG. 5 with the fastener head removed.
Figure 8:
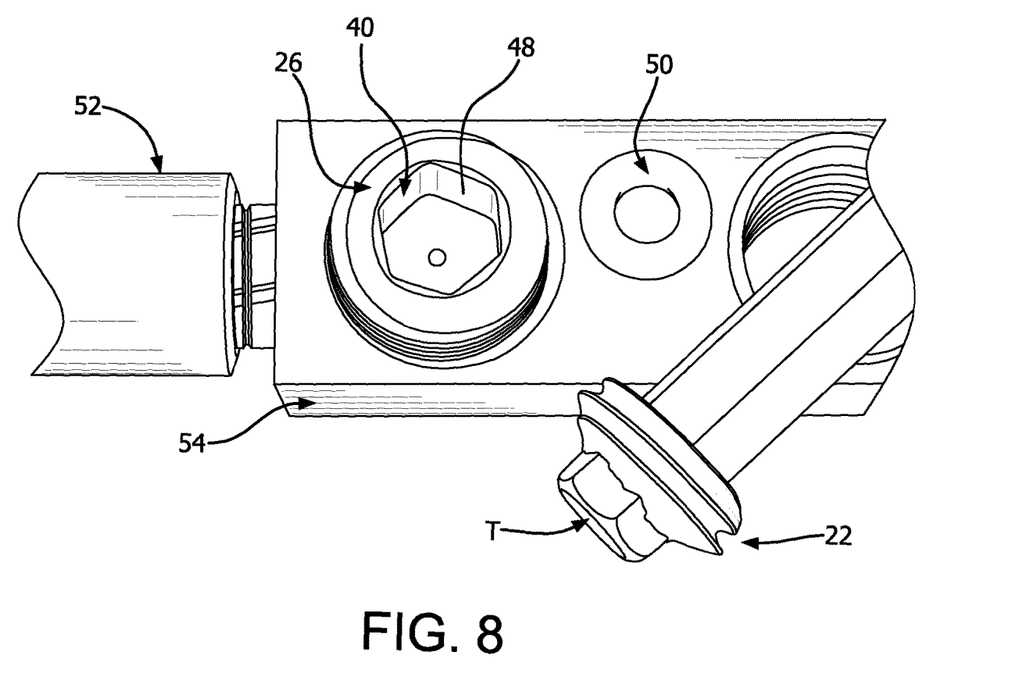
FIG. 8 is a top perspective view of the shearable fastener, conductor, and connector block of FIG. 5 with the fastener head and the insert removed.
Figure 9:
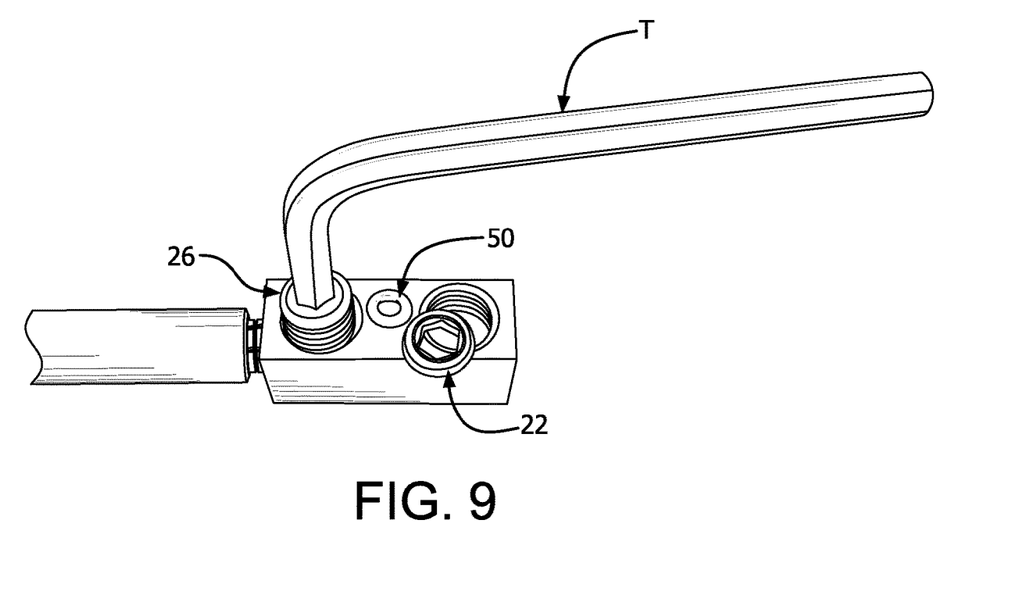
FIG. 9 is a top perspective view of the shearable fastener, conductor, and connector block of FIG. 5 with the fastener head and insert removed, and the tool engaging the base of the fastener.
Figure 10:
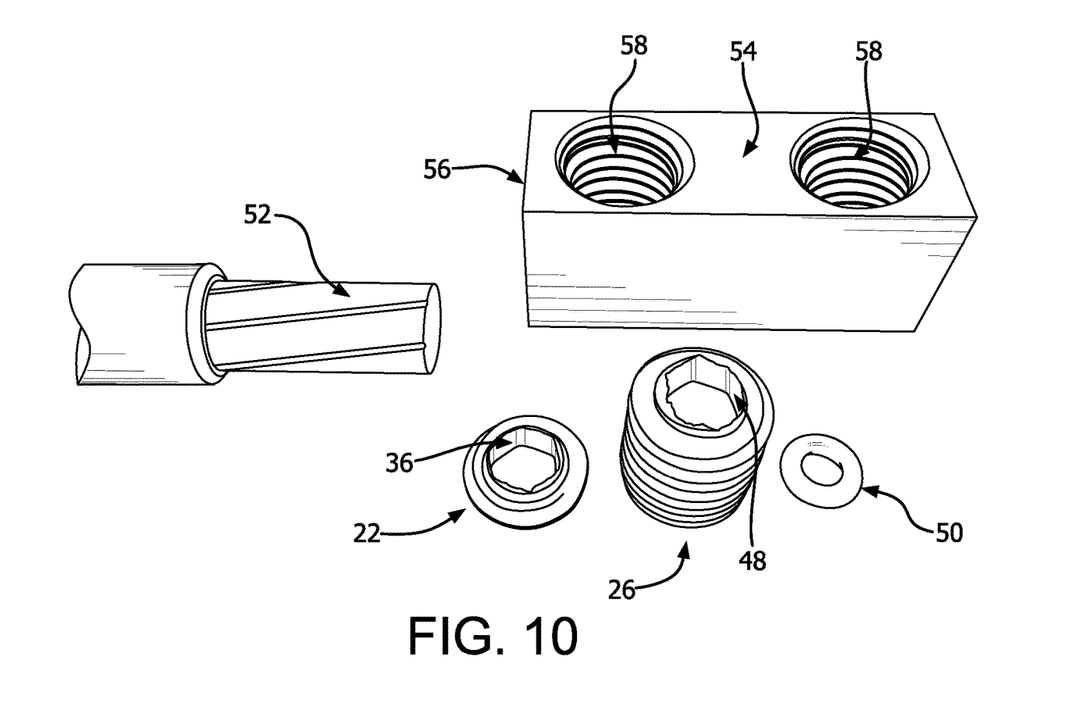
FIG. 10 is a disassembled top perspective view of the shearable fastener, conductor, and connector block of FIG. 9.
Figure 11:
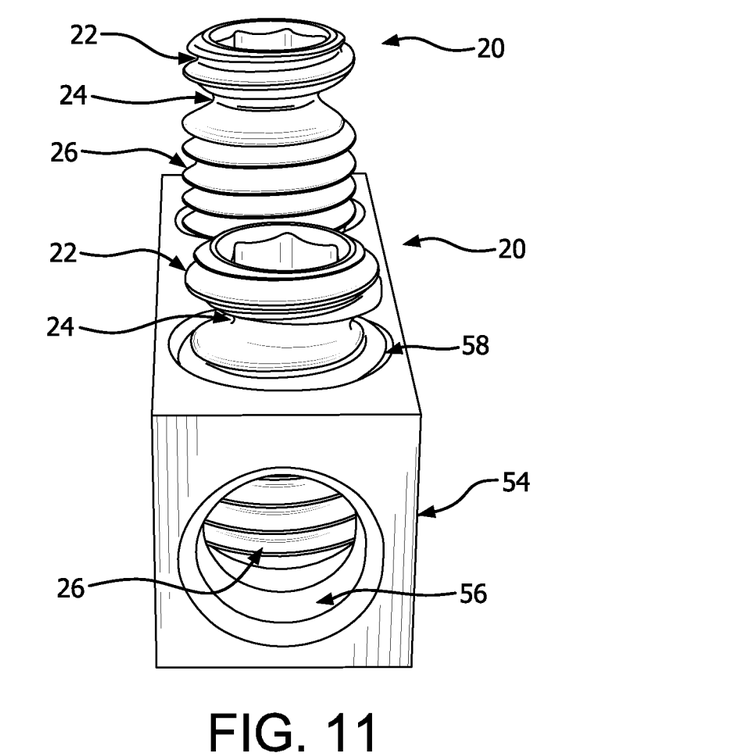
FIG. 11 is a left side perspective view of a pair of shearable fasteners connected to a connector block.
Figure 12:
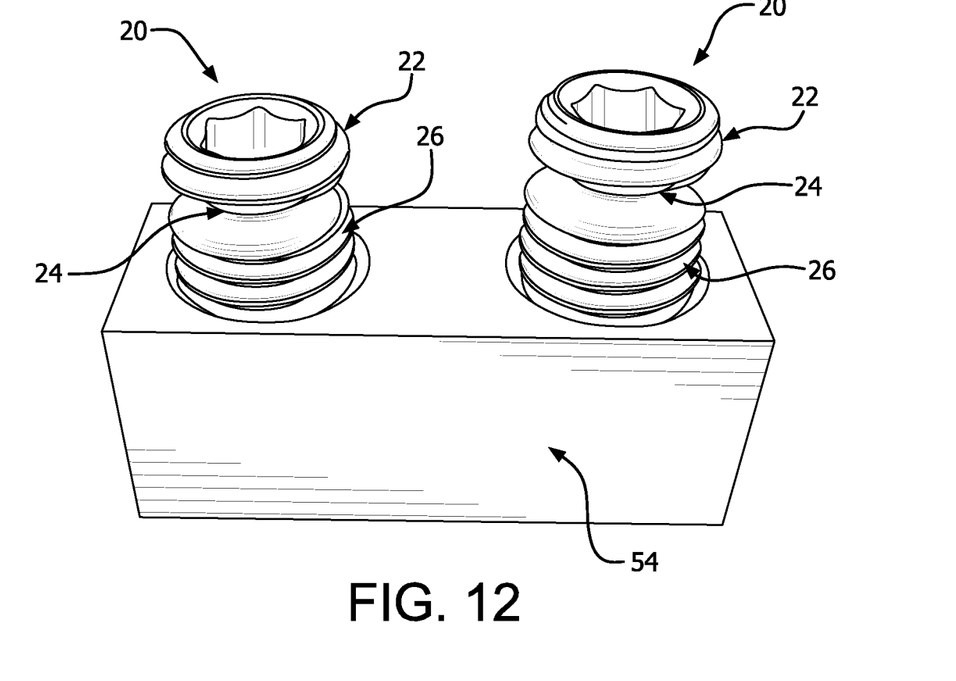
FIG. 12 is a front perspective view of the shearable fasteners and connector block of FIG. 11.

The shearable fastener 20 includes a blocking insert 50. The blocking insert 50 creates a barrier between the head socket 36 and the base socket 48 preventing, or assisting to prevent, the drive tool T from unwantedly extending through the central cavity and contacting the base socket 48. In an exemplary embodiment, the blocking insert 50 is a flexible or compressible member. The blocking insert 50 can be ring, for example an o-ring as shown in the exemplary embodiments of FIGS. 1-12, or the blocking insert 50 can have other suitable shapes, sizes, and configurations.

The blocking insert 50 can have any size or shape, or be made of any type of material, as long as it can be positioned in the shearable fastener 20 and removed to allow a user to access the base socket 48. In an exemplary embodiment, the blocking insert has a size that is greater than the interior of the head 22, shearable section 24, and/or base 26 to provide an interference frictional fit. For example, the blocking insert 50 can have a diameter or other cross dimension that is greater than a diameter or cross dimension of the interior of the shearable fastener 20. The blocking insert 50 is placed in the central cavity and rests at least partially in or below the shearable section 24. The blocking insert 50 may also rest entirely in the shearable section 24, entirely in the head 22, or partially in the head 22.

The blocking insert 50 is removable from the central cavity and may come preloaded in the shearable fastener 20 or it may be inserted as needed by a user. In various exemplary embodiments, the blocking insert may be removable at any time, including prior to separating the head 22 from the base 26. If a user desires to use the shearable fastener 20 without separating the head 22, for example if torque is required that exceeds the torque limit of the head 22, the blocking insert 50 can be removed and a tool T can be inserted into the base socket 48 and the shearable fastener 22 can be rotated. In various alternative embodiments, the blocking insert may only be removed after the head 22 has been separated from the base 26. Surface features, for example grooves, ridges, protrusions, etc., may be accordingly added to the head inner surface 30, the base inner surface 40, the shearable section 24, or any combination thereof to prevent or resist removal of the blocking insert 50.

In operation, the shearable fastener 20 is used to connect a conductor 52 to a connector block 54. The connector block 54 includes at least one conductor aperture 56 for receiving the conductor 52 and at least one threaded aperture 58 for receiving the shearable fastener 20. Typically there are at least two conductor apertures 56 and at least two threaded apertures 58. The conductor apertures 56 may have various sizes, shapes, positions, and orientations for connecting different conductors 52. The threaded apertures 58 are positioned orthogonal to conductor apertures 56 to allow the shearable fastener 20 to hold a conductor 52 in position, although in alternative embodiments, the shearable fastener 20 may enter the connector block 54 at other angles with respect to the conductor. The connector block 54 is made of metal, or another type of conductive material, and is used to provide an electrical connection between different conductors 52.

A conductor 52 is a least partially stripped and inserted into the connector block 54. The shearable fastener 20 may be initially positioned in the threaded aperture 58 or it may be placed in the threaded aperture 58 by a user subsequent to inserting the conductor 52. The blocking insert 50 may be preloaded or it may be inserted by a user prior to tightening the shearable fastener 20.

Once the shearable fastener 20, blocking insert 50, and conductor 52 are in place, a user inserts a drive tool T into the head socket 36. The tool T may extend into the head socket 36 only, or at least partially extend into the shearable section 24. The drive tool T is positioned above or in contact with the blocking insert 50 so that the drive tool T extends into the interior cavity of the head 22, but is resisted from entering the interior cavity of the base 26 by the blocking insert 50. The drive tool T is rotated to tighten the shearing fastener 20 and engage the bottom surface 42 with the conductor 52. Further rotation of the drive tool T requires an increasing amount of torque due to the resistance created by the contact between the shearable fastener 20 and the conductor 52. When the torque limit of the shearable fastener 20 is reached, additional rotation of the shearable fastener 20 causes a rupture of the shearable section 24, shearing and separating the head 22 from the base 26.

After the head 22 has been separated from the base 26, the user may choose to remove the blocking insert 50. The shearable fastener 20 may be subsequently removed by placing the same drive tool T into the base socket 48 and rotating the drive tool T until the shearable fastener 20 has disengaged the conductor 52 or has been removed from the threaded aperture 58. This allows the conductor 52 to be subsequently removed from the connector block 54 as needed.

In an exemplary embodiment, the shearable fastener 20 may formed from an existing screw. A fastener having an internal socket may be machined to have a shearable section 24 with a desired torque limit. For example, the fastener may be turned on a lathe to reduce a portion of the fastener to a desired outer diameter. Other methods may be used to create a shearable section 24, such as pressing, stamping, laser etching, or any other machining, forging, or forming process which would create a weakness or deformation in the fastener. A blocking insert 50 is then provided to be placed in the shearable fastener 20.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially," "about," or "approximately" are understood by those of ordinary skill to refer to reasonable ranges outside of the given value, for example, general tolerances associated with manufacturing, assembly, and use of the described embodiments.

What is claimed:

1. A fastener comprising:
a head having an inner surface including a first socket for receiving a drive tool;
a base including an outer surface having a base thread;
a shearable section positioned between and connecting said head and said base having a predetermined torque limit; and
a removable blocking insert positioned to hinder access of the drive tool to said base and allow access of the drive tool to the inner surface of said head, wherein said blocking insert is removable prior to separating said head from said base and wherein said blocking insert is positioned in at least one of said head, said base, and said shearable section.

2. The fastener of claim 1, wherein said head includes an outer surface having a head thread.

3. The fastener of claim 2, wherein said head thread and said base thread have a same pitch.

4. The fastener of claim 1, wherein said base includes a second socket.

5. The fastener of claim 4, wherein said second socket has a same size as said first socket.

6. The fastener of claim 4, wherein said first socket has a first hexagonal configuration and said second socket has a second hexagonal configuration.

7. The fastener of claim 4, wherein said first socket has a hexagonal configuration and said second socket has a non-hexagonal configuration.

8. The fastener of claim 1, wherein said blocking insert is positioned at least partially in said shearable section.

9. The fastener of claim 1, wherein said blocking insert is positioned at least partially in said base.

10. The fastener of claim 1, wherein said blocking insert includes a ring.

11. The fastener of claim 1, wherein said blocking insert is compressible.

12. The fastener of claim 1, wherein said shearable section includes an interior cavity and said blocking insert has a diameter greater than a cross dimension of said interior cavity and forms an interference friction fit with said interior cavity.

13. A fastener comprising:
a head having an inner surface including a first socket for receiving a drive tool;
a base having an inner surface including a second socket for receiving a drive tool and an outer surface having a thread;

a shearable section positioned between and connecting said head and said base having a predetermined torque limit and an inner surface; and a removable blocking insert positioned to hinder access of a drive tool to said second socket and allow access of the drive tool to said first socket, wherein said blocking insert is positioned at least partially in said shearable section.

14. The fastener of claim 13, wherein said second socket has the same size as said first socket.

15. The fastener of claim 13, wherein said first socket has a first hexagonal configuration and said second socket has a second hexagonal configuration.

16. The fastener of claim 13, wherein said first socket has a hexagonal configuration and said second socket has a non-hexagonal configuration.

17. The fastener of claim 13, wherein said blocking insert is positioned at least partially in said base.

18. The fastener of claim 13, wherein said blocking insert includes a compressible ring forming an interference fit inside the fastener.

19. The fastener of claim 13, wherein said shearable section includes an interior cavity bound by said inner surface and said blocking insert has a diameter greater than a cross dimension of said interior cavity.

20. The fastener of claim 13, wherein said blocking insert is prevented from being removed prior to said head separating from said base.

* * * * *